United States Patent [19]

Shimaoka et al.

[11] Patent Number: 4,587,585
[45] Date of Patent: May 6, 1986

[54] LOADING/EJECTING DEVICE FOR A MAGNETIC DISK CARTRIDGE

[75] Inventors: Motohiro Shimaoka; Yukio Saito, both of Furukawa, Japan

[73] Assignee: Alps Electric Co., Ltd., Japan

[21] Appl. No.: 564,073

[22] Filed: Dec. 21, 1983

[30] Foreign Application Priority Data

Dec. 21, 1982 [JP] Japan .......................... 57-192130[U]

[51] Int. Cl.⁴ .................... G11B 5/012; G11B 23/03
[52] U.S. Cl. ...................................... 360/97; 360/133
[58] Field of Search ................... 360/97, 99, 86, 133, 360/96.1, 96.5, 96.6; 242/197, 199, 198

[56] References Cited

U.S. PATENT DOCUMENTS

| | | | |
|---|---|---|---|
| 3,904,149 | 9/1975 | Suzuki | 242/198 |
| 3,936,011 | 2/1976 | Staar | 242/198 |
| 4,185,314 | 1/1980 | Hatchett et al. | 360/133 |
| 4,257,075 | 3/1981 | Wysocki et al. | 360/96.5 |
| 4,368,495 | 1/1983 | Hamanaka et al. | 360/97 |
| 4,380,780 | 4/1983 | Hirata et al. | 360/97 |
| 4,471,397 | 9/1984 | Cloutier | 360/133 |
| 4,488,190 | 12/1984 | Oishi et al. | 360/97 |

FOREIGN PATENT DOCUMENTS

| | | | |
|---|---|---|---|
| 0082505 | 6/1983 | European Pat. Off. | 360/133 |
| 55-163655 | 12/1980 | Japan | 360/93 |
| 55-160358 | 12/1980 | Japan | 360/93 |
| 57-3254 | 1/1982 | Japan | 360/93 |
| 2082371 | 3/1982 | United Kingdom | 360/99 |
| 2103862 | 2/1983 | United Kingdom | 360/133 |

OTHER PUBLICATIONS

Yanker, "Diskette Orientation Detector & Ejector", IBM Technical Disclosure Bulletin, v. 23, n. 7A, Dec., 1980.

Primary Examiner—A. J. Heinz
Assistant Examiner—Benjamin Urcia
Attorney, Agent, or Firm—Guy W. Shoup

[57] ABSTRACT

A recording/reproducing device including a detector means for detecting a closed state of a magnetic head insertion aperture opening and closing shutter attached to a disc cartridge when the disc cartridge is inserted into a cartridge holder up to a predetermined position, and a load stopping means for stopping the cartridge from assuming a loaded state upon detection of the closed state of the shutter by the detector means. Since the transfer to the loaded state of the disc cartridge is effected after making sure that the magnetic head insertion aperture is open, the recording and playback can be done always in a proper condition, thus permitting improvement of reliability.

7 Claims, 5 Drawing Figures

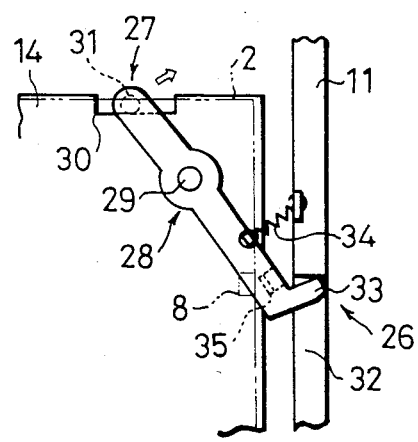

LOADING/EJECTING DEVICE FOR A MAGNETIC DISK CARTRIDGE

BACKGROUND OF THE INVENTION (1) Field of the Invention:

The present invention relates to a recording/reproducing device using a disc cartridge.

(2) Description of the Prior Art

Recently, there has been developed a disc cartridge formed of a hard material in which is rotatably enclosed a magnetic disc, the disc cartridge having a magnetic head insertion aperture formed in a predetermined position thereof and a shutter for opening and closing the magnetic head insertion aperture. When this disc cartridge is inserted in a recording/reproducing device, the shutter moves pivotally in cooperation with the recording/reproducing device to open the magnetic head insertion aperture, now ready for recording and reproducing. On the other hand, while this disc cartridge is not in use, the magnetic head insertion aperture is closed by the shutter to prevent dust or the like from entering the cartridge to avoid a bad influence upon recording and playback.

But, in the event the disc cartridge should be inserted in a closed state of the magnetic head insertion aperture due to a malfunction of the shutter, the conventional recording/reproducing device allows the disc cartridge to be loaded as it is, so that not only it becomes impossible to effect recording or playback, but also the fore end portion of the magnetic head strikes against the shutter.

SUMMARY OF THE INVENTION

It is the object of the present invention to provide a recording/reproducing device which can eliminate the above-mentioned drawbacks of the prior art and which permits setting of the cartridge only in a normal state.

In order to achieve the above object, the recording/reproducing device of the present invention is characterized by including a detector means for detecting a closed state of a magnetic head insertion aperture opening and closing shutter attached to a disc cartridge when the disc cartridge is inserted into a cartridge holder up to a predetermined position, and a load stopping means for stopping the cartridge from assuming a loaded state upon detection of the closed state of the shutter by the detector means.

BRIEF DESCRIPTION OF THE DRAWINGS

FIG. 5 is a top view of detector means portion thereof.

DESCRIPTION OF A PREFERRED EMBODIMENT

Figure 1:
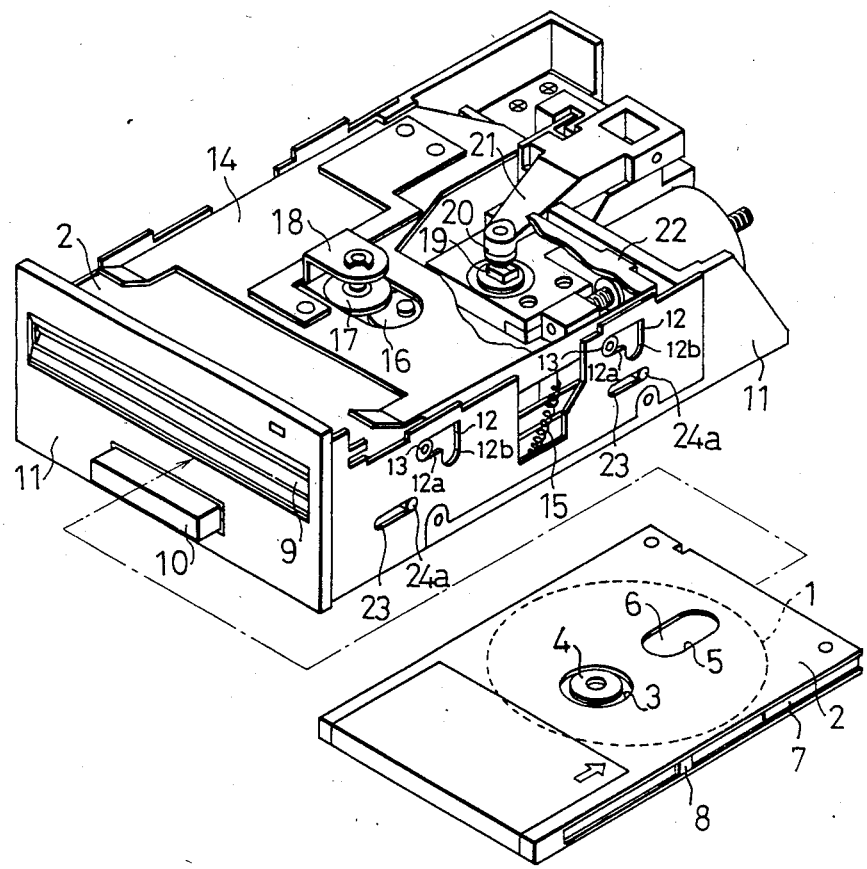
FIG. 1 is a schematic perspective view of a recording/reproducing device according to an embodiment of the present invention.

An embodiment of the present invention will be described hereinunder with reference to the accompanying drawings.

A magnetic disc 1 is rotatably enclosed in a cartridge 2 which is formed of a hard synthetic resin; a hub 4 which centrally holds the magnetic disc 1 is exposed to a through hole 3 formed centrally in the cartridge 2; and a shutter 6 which comprises a metallic plate is disposed pivotably under a magnetic head insertion aperture 5 formed in a predetermined position of the cartridge 2. A groove 7 is formed in each of both sides of the cartridge 2, in one of which is slidably fitted a shutter operating portion 8. The shutter operating portion 8 is connected to the shutter 6 and is urged resiliently at all times in the direction of closing the magnetic head insertion aperture 5.

Figure 2:
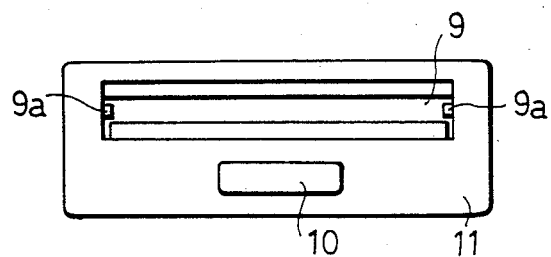
FIG. 2 is a front view thereof.
Figure 3:
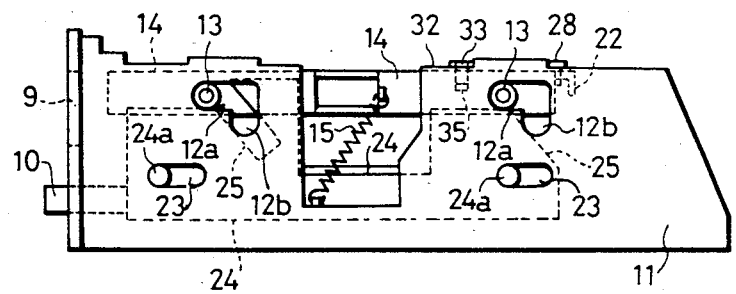
FIG. 3 is a side view showing principal components thereof in a non-operating state.
Figure 4:
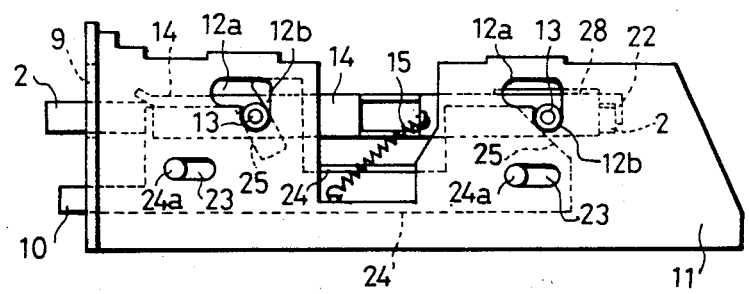
FIG. 4 is a side view showing principal components thereof in an operating state.

On the other hand, the front frame portion of the recording/reproducing device is provided with a cartridge insertion opening 9 and an eject button 10, and in positions just behind the cartridge insertion opening 9 there project opening/closing pins 9a adapted to be inserted in the grooves 7 of the cartridge 2 and engaged with the shutter operating portion 8 to open the shutter 6, as shown in FIG. 2. Further, behind the insertion opening 9 is disposed a cartridge holder 14 provided at side portions thereof with rollers 13 which are guided along ⏋-shaped slots 12 formed in both side walls of a frame 11. The cartridge holder 14 is urged downwards in the direction of the front frame at all times by means of a tension spring 15 stretched between the cartridge holder and the frame 11. While the cartridge 2 is not inserted in the cartridge holder 14, the roller 13 is held in the fore end position of a horizontal portion 12a of the ⏋-shaped slot 12, as shown in FIG. 3. On the front upper portion of the cartridge holder 14 is mounted a receiving portion 18 for a pressing portion 17 which presses the hub 4 of the magnetic disc 1 against a turntable 16, as shown in FIG. 1. On the rear upper surface of the cartridge holder 14 is formed an abutting portion, in opposed relation to a magnetic head 19, for pushing up an arm 21 with a pad 20 attached thereto when the roller 13 of the cartridge holder is located in the horizontal portion 12a of the ⏋-shaped slot 12. The cartridge holder 14 is further provided at its rear end with a downwardly bent portion 22 for abutment with the fore end of the cartridge 2, as shown in FIGS. 3 and 4.

To the eject button 10 is connected a push-up member 24. The push-up member 24 is provided at each side portion thereof with a pin 24a which is guided by a slot 23 formed in each side wall of the frame 11, and it is further provided with an inclined portion 25 capable of abutting the roller 13 in a vertical portion 12b of the ⏋-shaped slot 12.

On the upper surface of the cartridge holder 14, as shown in FIG. 5, a lever 28 which acts as both a load stopping means 26 and a detector means 27 for detecting a closed state of the shutter 6 is supported at its central part pivotably with a pin 29. To one end of the lever 28 is fixed a depending shaft 31 which is positioned in a recess 30 formed in the rear end portion of the cartridge holder 14, while the other end of the lever 28 is formed with a pawl portion 33 which engages a notched portion 32 of the frame 11. Both ends of the lever 28 are urged respectively toward the recess 30 and the notched portion 32 at all times by means of a spring 34 stretched between the lever 28 and the frame 11. Further, the lever 28 has an abutting portion 35 formed on its lower surface on the side of the pawl portion 33. The fore end part of the abutting portion 35 is capable of being inserted in the groove 7 of the cartridge 2 and it is positioned in opposed relation to the shutter operating portion 8 in the closed state of the shutter 6.

Therefore, as the cartridge 2 is inserted from the cartridge insertion opening 9, the opening/closing pin 9a is inserted in the groove 7 of the cartridge 2 and comes into engagement with the operating portion 8 for the shutter 6 to open the shutter. When the fore end of the cartridge 2 pushes the depending shaft 31 of the lever 28, the lever 28 goes away from the recess 30 against the spring 34 and pivotally moves clockwise as shown in FIG. 5. Since there is no obstacle in this state, the abutting portion 35 of the lever 28 gets in the groove 7, whereby the engagement or lock between the pawl portion 33 and the notched portion 32 of the frame 11 is released. At this time, since the cartridge 2 and the bent portion 22 are in abutment with each other, the roller 13 is positioned above the vertical portion 12b of the ⌐-shaped slot 12, so it is pushed down in the vertical portion 12b by virtue of the bias of the tension spring 15 and thus the cartridge holder 14 assumes a loaded state, whereupon the hub 4 of the magnetic disc 1 is urged against the turntable 16 by the pressing portion 17 attached to the cartridge holder 14, and the magnetic disc 1 is now ready to rotate. On the other hand, since the magnetic head insertion aperture 5 of the cartridge 2 is open, the pad 20 attached to the fore end of the arm 21 goes down with descent of the cartridge holder 14, whereby the magnetic disc 1 is urged against the magnetic head 19, now ready for recording and playback.

When the cartridge 2 is inserted from the cartridge insertion opening 9, if it should be inserted up to a predetermined position without engagement of the shutter operating portion 8 with the opening/closing pin 9a, that is, with the magnetic head insertion aperture 5 kept closed with the shutter 6, for some reason or other, for example, because of a dimensional error or wear of the shutter operating portion 8, the abutting portion 35 of the lever 28 is prevented from entering the groove 7 by the shutter operating portion 8 as shown in FIG. 5, so that the lever 28 cannot move pivotally until the pawl portion 33 and the notched portion 32 of the frame 11 are unlocked. Thus, the pawl portion 33 prevents the cartridge 2 from assuming a loaded state.

In this embodiment, the pawl portion 33 and the abutting portion 35 of the lever 28 serve as the load stopping means 26 and the detector means 27, respectively. Alternatively, there may be adopted an optical means as the detector means 27 to detect an open or closed state of the shutter 6, and the load stopping means may be operated in accordance with the result of the detection.

For returning the cartridge holder 14 from the loaded state to the unloaded state, the eject button 10 is pushed inwards, whereupon the roller 13 positioned in the lower part of the vertical portion 12b of the ⌐-shaped slot 12 is pushed up by the inclined portion 25 of the push-up member 24, so that the roller goes up while being held by the inclined portion 25 and the vertical portion 12b of the ⌐-shaped slot 12. When the roller 13 reaches the horizontal portion 12a, it is no longer in abutment with the inclined portion 25, so it is moved to the fore end of the horizontal portion 12a by the action of the tension spring 15 of the cartridge holder 14. With this movement of the roller 13, the cartridge holder 14 also moves up toward the cartridge insertion opening 9 and assumes the state before loading.

According to the present invention having the above-described construction, the transfer to the loaded state is effected after making sure that the magnetic head insertion aperture is open, and therefore the recording and playback can be done always in a proper condition without involving any meaningless operation, thus permitting improvement of reliability.

What is claimed is:

1. A loading/ejecting device for magnetic disk carriage comprising a housing frame, a cartridge holder for holding a cartridge inserted therein, a detector means for detecting a closed state of a magnetic head insertion aperture opening and closing shutter in the cartridge when it is inserted in the cartridge holder in a predetermined position, and a load stopping means for stopping the cartridge from assuming a loaded state upon detection of the closed state of said shutter by said detector means, said cartidge holder being provided with a pivotable lever one endof which is capable of abutting said cartridge and serving as said detector means, and the other end of which is engageable with housing frame and is provided with an abutting portion for abutting a shutter operating portion of the cartidge to prevent the pivotal movement of said lever and thereby serving as said load stopping means.

2. The loading/ejecting device of claim 1 wherein said frame includes inverted-L shaped slots formed therein, said cartidge holder being guided along said slots and urged downwards in the front frame direction to assumed said loaded state.

3. A recording/reproducing device according to claim 1, wherein said lever is mounted on the upper surface of said cartridge holder.

4. A recording/reproducing device according to claim 1, wherein said other end of said lever is engageable with a notched portion formed in said frame.

5. A recording/reproducing device according to claim 1, having means for urging said one end of said lever in the direction of abutment with said cartidge.

6. A recording/reproducing device according to claim 1, wherein said shutter comprises a metallic plate and is connected to a shutter operating portion fitted in a groove formed in said cartridge, said shutter operating portion being urged resiliently in the direction of closing said magnetic head insertion aperture.

7. A loading/ejecting device for a magnetic disk cartridge comprising a housing frame, a cartridge holder for holding a cartridge inserted therein, a detector means for detecting a closed state of a magnetic head insertion aperture opening and closing shutter in the cartridge when it is inserted in the cartidge holder in a predetermined position, and a load stopping means for stopping the cartridge from assuming a loaded state upon detection of the closed state of said shutter by said detector means, said cartridge holder being provided with a pivotable lever one end of which is capable of abutting said cartridge and serving as said detector means, and the other end of which is engageable with the housing frame and is provided with an abutting portion for abutting a shutter operating portion of the cartidge to prevent the pivotal movement of said lever and thereby serving as said load stopping means,
  wherein said frame includes inverted-L shaped slots formed therein, said cartridge holder being guided along said slots and urged downwards in the front frame direction to assume said loaded state, and being moved by the operation of a push up member having an inclined portion.

* * * * *